United States Patent [19]

Hendricks et al.

[11] Patent Number: 4,653,309
[45] Date of Patent: Mar. 31, 1987

[54] HAND TOOL FOR INSTALLING PLASTIC FASTENERS

[75] Inventors: Daniel A. Hendricks, Bothell; Warren E. Townsend, Seattle, both of Wash.

[73] Assignee: The Boeing Company, Seattle, Wash.

[21] Appl. No.: 816,904

[22] Filed: Jan. 7, 1986

[51] Int. Cl.[4] .............................................. B21B 31/00
[52] U.S. Cl. .................................. 72/391; 29/243.53; 29/268
[58] Field of Search ............... 72/391; 29/243.53, 268, 29/243.54

[56] References Cited

U.S. PATENT DOCUMENTS

| | | |
|---|---|---|
| 565,413 | 8/1896 | Pepper . |
| 786,844 | 4/1905 | Sanders . |
| 1,301,185 | 4/1919 | Sorensen . |
| 2,374,582 | 4/1945 | Caldarelli . |
| 2,532,972 | 12/1950 | Vertin . |
| 2,571,819 | 10/1951 | Boel et al. . |
| 2,615,181 | 10/1952 | McGaughey . |
| 2,792,622 | 5/1957 | Wurzel . |
| 2,826,106 | 3/1958 | Schegulla . |
| 2,863,158 | 12/1958 | Miller . |
| 3,180,128 | 4/1965 | Faulkner . |
| 4,307,598 | 12/1981 | Andrich .............................. 72/391 |

FOREIGN PATENT DOCUMENTS

| | | | |
|---|---|---|---|
| 461080 | 1/1951 | Italy . | |
| 636774 | 5/1950 | United Kingdom | .................. 72/391 |

OTHER PUBLICATIONS

"Nylatch Riveting System", brochure of The Hartwell Corporation, Placentia, Calif. 92670, copyright 1983.

Primary Examiner—Robert C. Watson
Attorney, Agent, or Firm—Joan H. Pauly

[57] ABSTRACT

One end of a pull rod (66) is pivotably attached to a lever (82), and the other end of rod (66) has a T-shaped slot (70) for receiving the head (28) and part of the shaft (24) of a plastic blind rivet fastener (22). Rod (66) slides axially in a tube (54) which has a radial end wall (60) with a slot (62) for slidably receiving the shaft (24). A spring (76) biases the rod (66) into a fastener-receiving position adjacent to wall (60). The lever (82) is squeezed toward a handle (56) to pull the rod (66) away from the wall (60) and the fastener head (28) axially inwardly. The abutment of the wall (60) against a collar (36) on shaft (24) slides collar (36) along shaft (24) to force a portion of a sleeve (30) on shaft (24) radially outwardly. A bent tube (104) may be provided instead of the straight tube (54). The pull member (110) received in the tube (104) has two rod portions (112,120) on oposite sides of the bend (106). These portions (112,120) are connected by a flexible cable (116).

9 Claims, 14 Drawing Figures

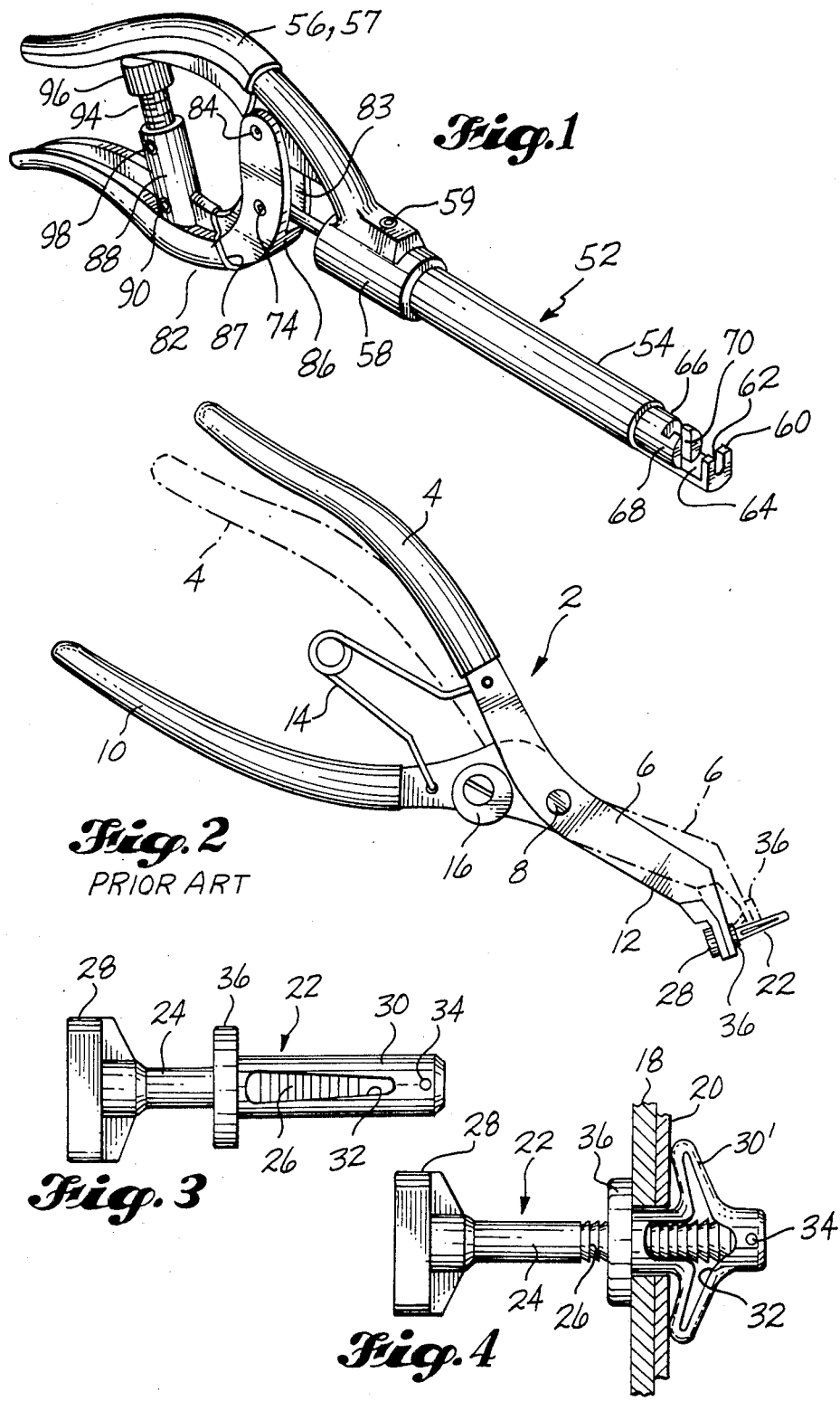

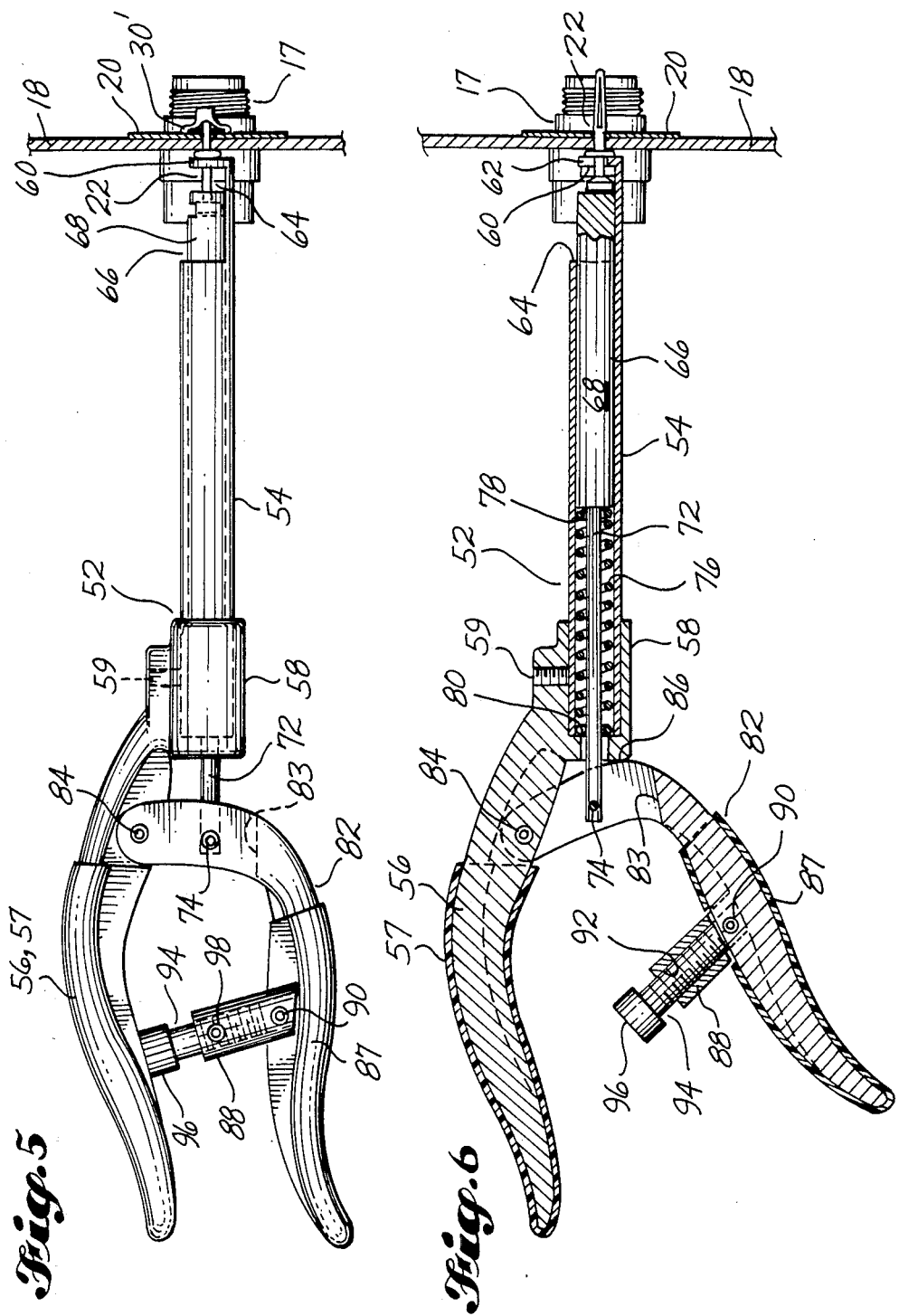

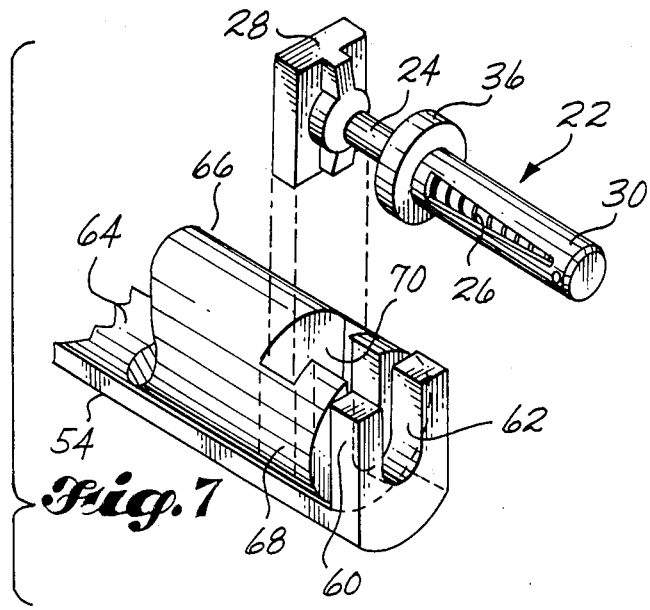
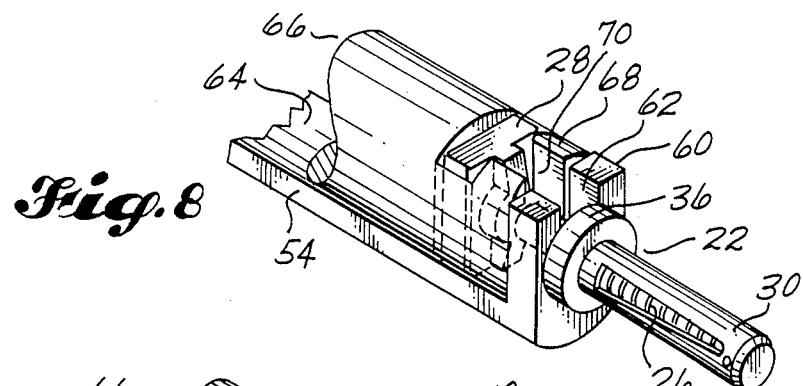
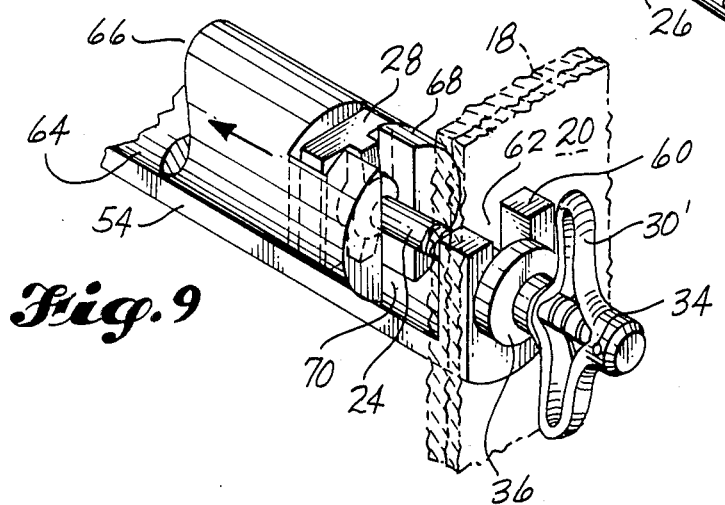

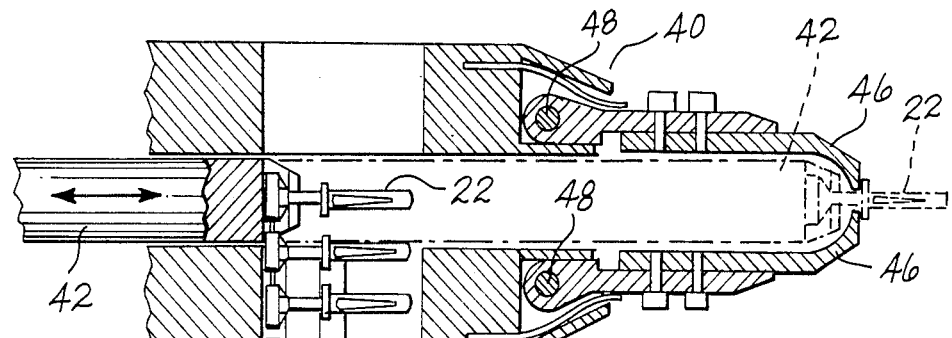
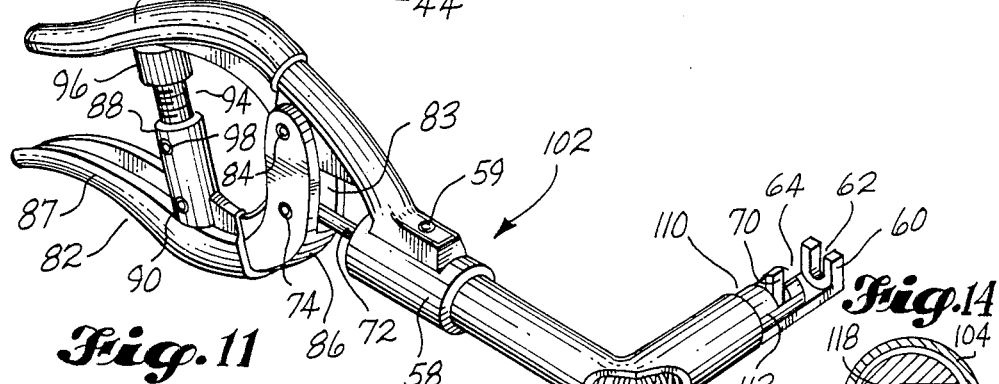
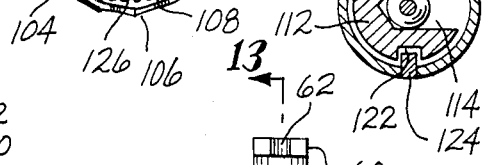
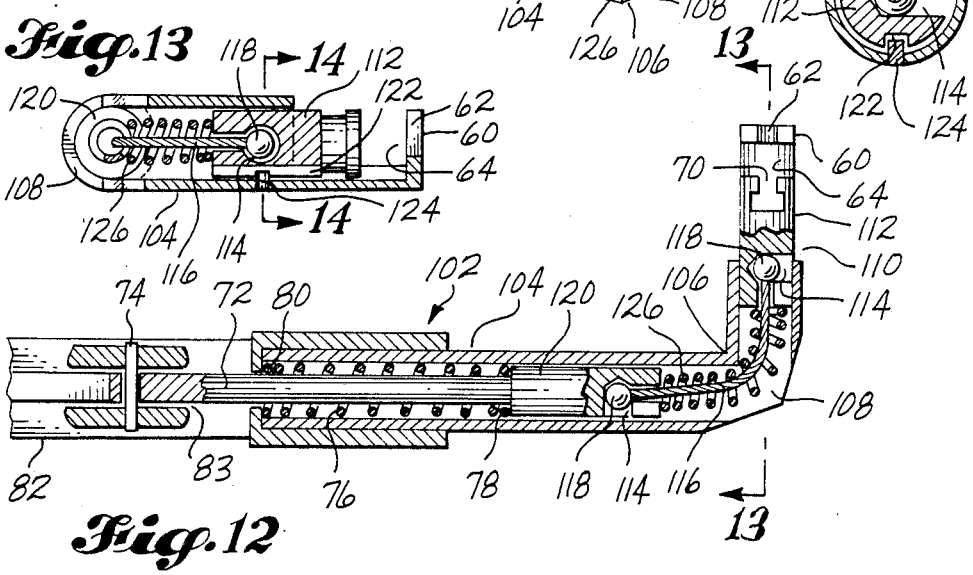

HAND TOOL FOR INSTALLING PLASTIC FASTENERS

DESCRIPTION

1. Technical Field

This invention relates to tools for installing blind rivet fasteners and, more particularly, to such a tool that holds the fastener for positioning the fastener with respect to a workpiece without any force being applied to the tool, and that has a hand operated lever for pulling one end of the fastener to cause the other end to engage the blind side of the workpiece.

2. Background Art

In a large commercial aircraft, there are generally thousands of multipin electrical connectors, such as the type of connector sold under the trademark Cannon Plug, that are mounted onto bulkheads, electrical panels, or the like. During assembly of the aircraft, each of these electrical connectors must be installed separately. The usual hardware for installing a connector includes two screws, two washers, and two clip nuts for securing the connector to a panel or the like. The installation of multipin connectors using this type of hardware is expensive because it is labor intensive and the screws, washers, and clip nuts are relatively expensive. In addition, all parts of the hardware are normally made from metal and, thus, add a significant amount of weight to the aircraft.

The disadvantages of the conventional attaching hardware had led to efforts to provide a fastener to replace such hardware in nonstructural applications. These efforts have resulted in the development of plastic fasteners of the blind rivet type. For example, the Hartwell Corporation of Placentia, Calif., has developed a fastener which it markets under the trademark Nylatch. Fasteners like the Nylatch blind rivet are much more lightweight and less costly than the previously used metallic screws, washers, and clip nuts. In addition, such fasteners are generally easier to install than the former hardware and, thus, provide savings in labor costs.

A problem that has arisen in connection with the use of plastic blind rivets is that the tools available for installing such rivets tend to be hard to use in limited access areas, such as areas between rows of connectors and at the bottom of a rack. In addition, known hand tools for installing such fasteners generally have a limited range of grip length adjustment and often do not maintain the adjustment well so that readjustment must constantly be made. The combination of awkward use in limited access areas and difficult adjustment results in inconsistency in obtaining properly mounted rivets. Some of the rivets that are installed are loose so that they must be removed and replaced. The need to replace loose rivets significantly reduces the labor and cost saving advantages of the fasteners.

U.S. Pat. No. 565,413, granted Aug. 4, 1896, to C. L. Pepper, and U.S. Pat. No. 2,792,622, granted May 21, 1957, to H. Wurzel, each disclose a plier-like tool for positioning a small object, a rubber plug and a metal retaining ring, respectively. The Wurzel tool has an adjustable screw that is attached to one handle by means of a bracket and that abuts the other handle to limit movement of the handles with respect to each other. U.S. Pat. No. 2,571,819, granted Oct. 16, 1951, to H. C. Boel et al., discloses a plier-type shot splitting tool with a similar adjusting mechanism between its handles. U.S. Pat. No. 2,826,106, granted Mar. 11, 1958, to H. Schegulla, discloses pliers for bending metal strips having an adjustment screw at the upper end of its handles for limiting movement of the handles and a gauge mounted between the handles to aid in setting the adjustment screw. U.S. Pat. No. 2,863,158, granted Dec. 9, 1958, to K. T. Mlller, discloses a plier-like wire cutting and stripping tool having cutting means mounted on one handle and extending toward the other handle.

U.S. Pat. No. 786,844, granted Apr. 11, 1905, to W. J. Sanders; U.S. Pat. No. 1,301,185, granted Apr. 22, 1919, to N. C. Sorensen; U.S. Pat. No. 2,374,582, granted Apr. 24, 1945, to F. Caldarelli; U.S. Pat. No. 2,532,972, granted Dec. 5, 1950, to D. D. Vertin; U.S. Pat. No. 2,615,181, granted Oct. 28, 1952, to J. H. McGaughey; and U.S. Pat. No. 3,180,128, granted Apr. 27, 1965, to O. V. Faulkner; and Italian patent document No. 461,080, dated Jan. 10, 1951, each disclose a hand tool having a sliding rod for operating jaws or other clamping means. In each of these documents, except the Vertin patent, the rod is operated by squeezing a lever. Sorensen discloses tongs for holding welding material in which a spring urges a rod downwardly with respect to a sleeve to clamp the material between two jaws and the lever is operated to push the rod to release the material. In the Caldarelli rivet holder, the lever is operated to push against the rod to in turn push apertures in a flat member out of alignment with apertures in another member to grip the rivet for placement in an inaccessible location, such as the interior of a pipe. McGaughey discloses a wire holding and cutting tool in which the lever is squeezed to push the rod to in turn close jaws around a piece of wire. In each of the devices disclosed by Faulkner and the Italian patent, the lever is pivotably attached to a portion of the tool housing and the rod is pivotably attached to the lever. In each case, the lever is operated to pull the rod against the force of a spring and close a set of jaws. The Faulkner device is a crimping tool, and apparently the Italian device is a nail driver.

The patents and the known devices that are discussed above and the prior art that is discussed and/or cited in the patents should be studied for the purpose of putting the present invention into proper perspective relative to the prior art.

3. Disclosure of the Invention

The subject of the invention is a tool for installing a fastener of the type having a shaft, a head, a sleeve generally surrounding the shaft and having a first end secured thereto opposite the head and a second end, and a collar slidably mounted on the shaft and secured to said second end for moving said second end toward said first end to force a portion of the sleeve radially outwardly. According to an aspect of the invention, the tool comprises a body, a pull member, spring means, and hand operable lever means. The body has a tubular guide portion with a radial end wall for abutting the collar, a radial slot in such wall for slidably receiving the shaft, and an opening adjacent to the wall for receiving the head and adjacent portions of the shaft. The pull member is slidable in the guide portion and has one end with an axial slot therein for engaging the head. The spring means biases the pull member into a fastener-receiving position in which the axial slot is adjacent to the radial end wall of the guide portion. The lever means is pivotally attached to the body and the pull member for pulling such member against the force of the spring and the fastener head away from the radial end wall to thereby slide the collar along the shaft and force said portion of the sleeve radially outwardly.

The tool of the invention makes it possible to maximize use of plastic blind rivet fasteners for installing multipin electrical connectors in aircraft, and to consistently achieve proper mounting of such fasteners even in very difficult access areas. The maximized use and the consistent results in turn maximize the advantages of savings in weight and reduced material and labor costs. The tool is easy to operate and quickly installs each fastener and, thereby, provides further savings in labor costs. In addition, the tool is relatively simple in construction and inexpensive to manufacture and maintain and, thus, further decreases the overall cost of manufacturing and maintaining an aircraft.

A preferred feature of the invention is the inclusion of adjustment means for adjustably limiting pivotal movement of the lever means to adjust the grip length of the fastener. The term "grip length", as used herein, means the distance between the two opposite abutting surfaces of the fastener between which a workpiece is gripped. In the preferred embodiments, the body of the tool includes a handle to which the pull member is pivotably attached. The lever means includes a lever positioned to be squeezed toward and pivoted relative to the handle, to pull the pull member. The adjustment means comprises a stop member secured to one of the handle and the lever and projecting toward the other of the handle and the lever, a threaded opening in the stop member, and a tap bolt threadably received into said threaded opening and movable therein toward and away from said other of the handle and the lever.

The preferred embodiment of the adjustment means provides accurate adjustment of the grip length of the fastener and reliably maintains the adjustment until the operator changes it. The accurate and reliable adjusting of such grip length in turn helps to ensure consistency in the proper mounting of the fasteners. The structure of the preferred adjustment means makes it possible to adjust the grip length over a reliably wide range to increase the versatility and reliability of the tool.

The pull member of the tool of the invention may take a variety of forms. A first preferred embodiment of the pull member is a straight rod having a first end terminating in the radial end wall and a second end pivotably attached to the lever means. A second preferred embodiment of the pull member is adapted to cooperate with a tubular guide portion which has a bend therein of substantially 90°. This embodiment of the pull member comprises a first straight rod portion having a first end terminating in the radial end wall and a second end, a second straight rod portion having a first end pivotably attached to the lever means and a second end, and a flexible cable extending around the bend in the guide portion and having opposite ends secured to the second ends of the rod portions, respectively. The cable converts linear movement of the second rod portion into linear movement of the first rod portion. This embodiment of the pull member may, of course, also be used in combination with tubular guide portions having bends therein with an angular orientation other than 90°. The choice of the orientation of the guide portion and the form of the pull member depends on the needs of the particular situation in which the tool is to be used, especially the type of access that is available. The tool of the invention is sufficiently versatile to provide good access to virtually any location in an aircraft in which a multipin electrical connector is to be installed.

These and other advantages and features will become apparent from the detailed description of the best modes for carrying out the invention that follows.

BRIEF DESCRIPTION OF THE DRAWINGS

In the drawings, like element designations refer to like parts throughout, and:

FIG. 1 is a pictorial view of the first preferred embodiment of the tool of the invention.

FIG. 2 is a pictorial view of a known hand tool, showing the open position of one of its arms in broken lines.

FIG. 3 is an elevational view of a typical fastener which may be installed by use of the tool of the invention.

FIG. 4 is an elevational view of the fastener shown in FIG. 3 after it has been installed to attach two portions of a workpiece, shown in section.

FIG. 5 is an elevational view of the tool shown in FIG. 1 and the fastener shown in FIGS. 3 and 4 at the end of the fastener installation process, with the workpiece shown in section.

FIG. 6 is a sectional view of the apparatus shown in FIG. 5 at the beginning of the installation process, with parts shown in elevation.

FIG. 7 is a pictorial view of the outer end of the tool shown in FIGS. 1, 5, and 6 and the fastener shown in FIGS. 3 and 4, illustrating the positioning of the fastener in the tool.

FIG. 8 is like FIG. 7 except that it shows the fastener positioned in the tool and ready to be installed.

FIG. 9 is like FIGS. 7 and 8 except that it shows the fastener being installed.

FIG. 10 is a sectional view of a known pneumatic tool for installing fasteners of the type shown in FIGS. 3 and 4, with parts shown in elevation.

FIG. 11 is a pictorial view of the second preferred embodiment of the tool of the invention.

FIG. 12 is a sectional view of a portion of the tool shown in FIG. 11, with parts shown in elevation.

FIG. 13 is a sectional view taken along the line 13—13 in FIG. 12.

FIG. 14 is a sectional view taken along the line 14—14 in FIG. 13.

BEST MODES FOR CARRYING OUT THE INVENTION

The drawings show two embodiments of a tool 52,102 that are constructed according to the invention and that also constitute the best modes for carrying out the invention currently known to the applications. In the drawings, the tools 52,102 are shown being used to install a plastic blind rivet fastener 22, which is most clearly shown in FIGS. 3 and 4. In FIGS. 5 and 6, the fastener 22 is shown being installed to attach the mounting flange 20 of a Cannon Plug electrical connector 17 to a panel 18. It is anticipated that the tool of the invention will be used primarily for installing electrical connectors of the type shown in FIGS. 5 and 6 using fasteners of the types shown in FIGS. 3 and 4. However, it is of course to be understood that the tool of the invention may also be used to advantage for attaching a variety of devices other than cannon plug electrical connectors and that the tool may be used for installing other types of fasteners. The connector 17 and the fastener 22 are shown and described herein for the purpose of clearly illustrating the functioning and advantages of the tool of the invention.

The plastic fastener 22 shown in FIGS. 3 and 4 is generally about an inch long and has an axial shaft 24 and a head 28 positioned on one end of the shaft 24. A sleeve 30 generally surrounds the shaft 24 and has a first end secured at 34 to the end of the shaft 24 opposite the head 28. The sleeve 30 has two opposite axially extending slots 32 therein to facilitate the spreading of a portion of the sleeve 30' radially outwardly from the shaft 24. A collar 36 is slidably mounted on the shaft 24 and is secured to the end of the sleeve 30 opposite the attachment point 34, between the head 28 and the attachment point 34. The collar 36 is slidable along shaft 24 to move the end of the sleeve 30 attached thereto toward the first end attached to the shaft 24 and force sleeve portion 30' radially outwardly. Barbs 26 are provided on the shaft 24 between the collar 36 and attachment point 34 in order to prevent the collar 36 from slipping back toward the head 28. As can be seen in FIG. 4, the fastener is used to attach two plate-like members 18,20 by inserting the sleeve covered portion of the shaft 24 through suitable holes in members 18,20 until collar 36 abuts one of the members 18. Then, collar 36 is slid toward attachment point 34 to force sleeve portion 30' radially outwardly. In the installed position of the fastener 22 shown in FIG. 4, members 18,20 are securely held together between collar 36 and radially extending sleeve portion 30'.

For the purposes of comparison, two types of known tools for installing the type of fastener shown in FIGS. 3 and 4 are shown and described herein. FIG. 2 shows a known type of hand tool 2 for installing fastener 22. Tool 2 has a first arm 4,6 and a second arm 10,12 pivotally attached to each other by a pivot pin 8. Arm 4,6 has a handle portion 4 and a jaw portion 6, and arm 10,12 has a handle portion 10 opposing handle portion 4 and a jaw portion 12 opposing jaw portion 6. Handles 4,6 are squeezed together against the force of a spring 14 in order to spread jaws 6,12 apart. Each of jaws 6,12 has a slot, not shown, for receiving the shaft 24 of the fastener 22 between the head 28 and the collar 36. FIG. 2 illustrates in broken lines the open position of jaw 6. As can be seen in FIG. 2, jaws 6,12 move apart along an arcuate path rather than a straight line, and thus, the shaft 24 of the fastener 22 bends as the fastener 22 is being installed. Tool 2 is provided with an eccentric disk stop 16 of a plastic material to limit movement of arm 4,6 relative to arm 10,12. Disk 16 is rotated to adjust the amount of relative movement of handles 4,6 and 10,12 to in turn adjust the grip length of fastener 22.

FIG. 10 shows another known tool 40 for installing fasteners 22. Tool 40 is pneumatically operated and is designed for use in easy access areas. Tool 40 has a piston 42 that is pneumatically reciprocated in the directions indicated by the arrow in FIG. 10. In FIG. 10, the fastener receiving position of the piston 42 is shown in solid lines, and the fastener installing position of the piston 42 is shown in broken lines. A strip of fasteners 22 is fed into tool 40 by a feed mechanism 44. Each fastener 22 slides up into a slot (not shown) in the head of piston 42 to engage the fastener 22 in piston 42. Then air pressure is supplied to move the piston 42 in a forward direction to position the fastener 22 relative to a pair of jaws 46. Each jaw 46 is pivotably attached to tool 40 by a pivot pin 48. The jaws 46 are pivoted into an open position before the fastener 22 is moved into position relative to the jaws 46, and when the fastener 22 reaches the position shown in broken lines in FIG. 10, the jaws 46 pivot toward each other to close ground the shaft 24 of the fastener 22. The jaws 46 then abut the collar 36 to push the collar 36 axially outwardly when air pressure is supplied to move piston 42 axially inwardly.

Tools constructed according to the invention include a tubular guide portion and a pull member that is slidable in such guide portion. A lever is operated to pull the pull member and the head 28 of a fastener 22 and thereby slide the collar 36 of the fastener 22 to install the fastener 22. The pull member is biased into a fastener-receiving position in which it receives the fastener 22 and holds it for positioning relative to a workpiece. The biasing of the pull member enables an operator to hold the fastener 22 in the tool without exerting any force on the tool.

A first preferred embodiment of the tool of the invention is shown in FIGS. 1 and 5-9. The tool 52 includes a body 54,56,58, which has a tubular guide portion 54, a handle portion 56, and a cylindrical sleeve 58 for attaching tube 54 and handle 56 to each other. As can be seen in FIGS. 1, 5, and 6, the handle 56 is curved to be easily grasped by an operator's hand and has a plastic cover 57 for more comfortable operation. The handle 56 terminates in the cylindrical sleeve 58 which has an axial opening into which the inner end of the tube 54 is received. A set screw 59 secures the tube 54 in the sleeve 58.

The tube 54 guides axial movement of a pull member 66. In the embodiment shown in FIGS. 1 and 5-9, the pull member takes the form of a straight rod 66. The tube 54 also provides an abutting surface for abutting the collar 36 of a fastener 22 during installation of the fastener 22. The tube 54 terminates at its axially outer end in a radial end wall 60. A radial slot 62 is provided in the wall 60 for slidably receiving the shaft 24 of a fastener 22. The tube 54 has a circumferentially and axially extending opening 64 adjacent to and just axially inward of the end wall 60. This opening 64 allows the head 28 and adjacent portions of the shaft 24 of the fastener 22 to be received into and removed from the tube 54. The portion of the tube 54 axially inward of the opening 64 is closed around its circumference to provide an axial passageway for guiding movement of the rod 66. In this embodiment, the tube 54 is straight without and bends for providing access to fastener installation points in areas such as between closely spaced rows of connectors. The length of the tube 54 and the rod 66 may of course be varied to meet the needs of different types of situations.

The overall configuration of the rod 66 can most clearly be seen in FIG. 6. The front or axially outer portion 68 of the rod 66 has a diameter that is dimensioned to cause its outer circumfertial surface to closely and slidably engage the inner sidewall of tube 54. Axially inwardly of front portion 68 is a reduced diameter portion 72 which is coaxial with and secured at its forward end to portion 68. The axially inner end of reduced diameter portion 72 is pivotably attached to a lever 82, described in more detail below, by means of a pivot pin 74. A compression spring 76 surrounds the reduced diameter portion 72 and has one end abutting a shoulder 78 formed by the end of portion 68 to which reduced diameter portion 72 is attached, and an opposite end abutting a shoulder 80 formed by the sleeve 58 of the body 54,56,58. The spring 76 biases the rod 66 into a fastener-receiving position in which its forward end is adjacent to the radial end wall 60 of the tube 54.

The front end of rod 66 has an axial slot 70 therein for engaging the head 28 of a fastener 22. In the preferred embodiments of the tool, the slot 70 has a T-shaped axial section for receiving the head 28 and adjacent portions of the shaft 24 of the fastener 22. The T-shaped slot 70 opens onto the forward axial end of the rod 66 and extends radially all the way through the end of rod 66.

The tool 52 is operated by a hand lever 82 which is pivotably attached at 84 to the handle 56 of the body 54,56,58. The lever 82, like the handle 56, is curved and has a plastic cover 87 for comfort and ease of operation. The pivot attachment point 84 between handle 56 and lever 82 is spaced from the pivot attachment point 74 between lever 82 and rod 66 in order to cause lever 82 to pull rod 66 axially inwardly when lever 82 is squeezed toward handle 56. Lever 82 is provided with a groove 83 to accommodate pivoting of rod 66 relative to lever 82.

When the lever 82 is squeezed toward the handle 56, it pulls the rod 66 axially inwardly against the force of the spring 76. When the lever 82 is released, the spring 76 returns the rod 66 into its tool-receiving position shown in FIGS. 6 and 8. Movement of rod 66 axially outwardly into this position is limited by the engagement of a stop surface 86 on lever 82 against the inner end of sleeve portion 58 of body 54,56,58. See FIG. 6. Preferably, this occurs just before rod 66 strikes radial end wall 60 in order to reduce wear of the tool 52.

The tool 52 is also provided with means for limiting movement of the rod 66 in a rearward direction. In the preferred embodiments, such means includes a cylindrical stop member 88 which is secured to the lever 82 by a suitable fastener 90. The stop member 88 projects axially toward the handle 56 and has a threaded axial opening 92. A tap bolt 94 is threadedly received into this opening 92. The bolt 94 has a head or cap 96 which faces the handle 56. The bolt 94 may be turned to move the cap 96 axially toward and away from the handle 56. A set screw 98 is preferably provided (see FIG. 5) for locking the bolt 94 into its adjusted position. When the lever 82 is squeezed toward the handle 56, the cap 96 abuts against the handle 56 to limit pivotal movement of the lever 82 relative to the handle 56. This in turn limits the axial movement of the rod 66 to in turn adjust the grip length of the fastener 22.

The second preferred embodiment of the tool of the invention is shown in FIGS. 11–14. This embodiment 102 has a number of parts that are identical to the corresponding parts of the tool 52 shown in FIGS. 1 and 5–9. Such identical parts are given identical reference numbers in FIGS. 11–14 and FIGS. 1 and 5–9. The tool 102 includes a body 56,58,104 having a handle 56 and a sleeve 58 identical to the handle 56 and sleeve 58 of the first embodiment of the tool 52. The body 56,58,104 also includes a tubular guide member 104 which has a bend 106 therein of substantially 90°. The pull member 110 of tool 102 is adapted to accommodate the bend 106 in the tube 104. The parts of tool 102 other than the tube 104 and the pull member 110, including the lever 82 and the stop means 86 and 88,94, are identical to the corresponding parts of the tool 52 of the first embodiment. The bend 106 in the tube 104 provides access to fastener installation points, such as the bottom of a rack of connectors, which must be accessed from a laterally offset position.

The pull member 110 includes a forward straight cylindrical rod portion 112, a rear straight cylindrical rod portion 120, and a flexible cable 116 extending between and connecting rod portions 112,120. The tube 104 has a straight portion on either side of the bend 106 for receiving the rods 112,120 respectively. The cable 116 extends through the passageway formed by the tube 104 around the bend 106 to convert linear movement of rod 120 into linear movement of rod 112. Each end of cable 116 has a ball-type terminal 118 swaged thereon for attaching cable 116 to rods 112,120. Each rod 112,120 has a socket 114 into which the corresponding terminal 118 is received to attach the cable 116 to the rod 112,120. A spring 126 surrounds the cable 116 between rods 112,120 to guide movement of the cable 116 and reduce wear of cable 116. The cable 116 is preferably made from stranded carbon steel with a diameter in the order of 1/16th of an inch, and the terminals 118 are preferably made from a material such as corrosion resistant steel.

The outer portion of the tube 104 beyond the bend 106 has a radial end wall 60 with a radial slot 62 and an opening 64 identical to the corresponding portions of the tool 52 of the first embodiment. The front rod 112 includes an axial slot 70 like the slot 70 of tool 52 and has a diameter sized so that rod 112 is closely and slidably received into the outer portion of tube 104. The rear portion of tube 104 has the same structure as the rear portion of tube 54 of tool 52. Rear rod portion 120 has a forward end with a diameter sized to slidably engage the inner sidewall of the rear portion of tube 104, and a reduced diameter portion 72 and a shoulder 78 to cooperate with a spring 76 as described above.

In the assembly of the first embodiment of the tool 52, the rod 66 is positioned in the tube 54 by simply sliding it into the tube 54 through the axially inner end of the tube 54. This assembly procedure obviously does not work with a bent tube configuration. Therefore, the tube 104 of the tool 102 has an opening 108 extending around the bend 106. During assembly of the tool 102, the front rod 112 is inserted into the tube 104 through the opening 108, the rear rod 120, with cable 116 attached, is inserted into tube 104 through opening 108 or the rear end of tube 104, and then cable 116 is attached to rod 112. Following the positioning of the pull member 110 in the tube 104, the reduced diameter portion 72 of rod 120 is pivotably attached to lever 82. The front rod 112 has a groove 122 extending axially along its outer surface. A guide pin 124 is secured to the tube 104 and is received into groove 122 to properly position rod 112 during assembly of the tool 102 and to prevent rotation of rod 112 during operation of the tool 102.

The installation of a fastener 22 by means of the tool 52,102 may be accomplished easily and quickly. While allowing the spring 76 to hold the pull member 66,110 in its fastener-receiving position shown in FIGS. 6–8, the operator slides the fastener head 28 and shaft 24 into T-slot 70 and radial slot 62. FIG. 7 shows the fastener positioned above the tool 52 ready to be slid into slots 62,70. FIG. 8 shows the fastener 22 after it has been slid into position. With the fastener 22 in position, the operator grasps the tool 52,102 and, without exerting any pressure on lever 82, inserts the fastener sleeve 30 into the fastener holes in the workpiece 18,20 until collar 36 abuts workpiece portion 18. As shown in FIGS. 5 and 6, such portion 18 is a part of a panel 18 for receiving an electrical connector 17 having a flange 20.

When fastener 22 has been positioned relative to panel 18 and flange 20, the operator simply squeezes lever 82 toward handle 56 to pull the pull member 66,110 and thereby pull the fastener head 28 away from the collar 36. As head 28 is pulled, the abutment of radial end wall 60 against collar 36 pushes collar 36 along shaft 24 to spread sleeve portion 30' radially outwardly on the opposite side of the workpiece 18,20. FIG. 9 shows head 28 being pulled rearwardly. FIGS. 4 and 5 show the fastener 22 fully installed. After the fastener 22 has been installed, the head 28 and the projecting portion of the shaft 24 are preferably cut off so that they do not interfere with the electrical connectors 17. Before installing fasteners 22 on a particular panel 18, the grip length of the fasteners 22 is set to the thickness of the panel 18 and the flanges 20 by adjusting the tap bolt 94 as described above.

The tool of the invention provides quick, easy, and accurate placement of fasteners 22 even in very difficult access areas. The pulling of the head 28 relative to the collar 36 in a straight line along the axis of the fastener 22 helps insure the accuracy of the mounting of the fastener 22 and the even expansion of the two diametrically opposite parts of expandable sleeve portion 30'. This, in combination with the accurate and reliable adjustment of the fastener grip length provided by adjustment means 88,94, makes it possible to consistently achieve tight and secure mounting of the fasteners 22.

Although the preferred embodiments of the invention have been illustrated and described herein, it is intended to be understood by those skilled in the art that various modifications and omissions in form and detail may be made without departing from the spirit and scope of the invention as defined in the following claims.

What is claimed is:

1. A tool for installing a fastener of the type having a shaft, a head, a sleeve generally surrounding the shaft and having a first end secured thereto opposite the head and a second end, and a collar slidably mounted on the shaft and secured to said second end for moving said second end toward said first end to force a portion of the sleeve radially outwardly, said tool comprising:
   a body including a tubular guide portion which has a radial end wall for abutting the collar, a radial slot in said wall for slidably receiving the shaft, and an opening adjacent to said wall for receiving the head and adjacent portions of the shaft;
   a pull member slidable in the guide portion and having one end with an axial slot therein for engaging the head;
   spring means for biasing the pull member into a fastener-receiving position in which the axial slot is adjacent to the radial end wall of the guide portion; and
   hand operable lever means pivotably attached to the body and the pull member for pulling said member against the force of the spring and the fastener head away from the radial end wall to thereby slide the collar along the shaft and force said portion of the sleeve radially outwardly.

2. A tool as described in claim 1, further comprising adjustment means for adjustably limiting pivotal movement of the lever means to adjust the grip length of the fastener.

3. A tool as described in claim 2, in which the body includes a handle to which the pull member is pivotably attached; the lever means includes a lever positioned to be squeezed toward and pivoted relative to the handle, to pull the pull member; and the adjustment means comprises a stop member secured to one of the handle and the lever and projecting toward the other of the handle and the lever, a threaded opening in the stop member, and a tap bolt threadedly received into said threaded opening and movable therein toward and away from said other of the handle and the lever.

4. A tool as described in claim 1, in which the pull member is a straight rod having a first end terminating in said radial end wall and a second end pivotably attached to the lever means.

5. A tool as described in claim 1, in which the tubular guide portion has a bend therein of substantially 90°; and the pull member comprises a first straight rod portion having a first end terminating in said radial end wall and a second end, a second straight rod portion having a first end pivotably attached to the lever means and a second end, and a flexible cable extending around said bend and having opposite ends secured to the second ends of the rod portions, respectively, to convert linear movement of the second rod portion into linear movement of the first rod portion.

6. A tool as described in claim 2, in which the pull member is a straight rod having a first end terminating in said radial end wall and a second end pivotably attached to the lever means.

7. A tool as described in claim 2, in which the tubular guide portion has a bend therein of substantially 90°; and the pull member comprises a first straight rod portion having a first end terminating in said radial end wall and a second end, a second straight rod portion having a first end pivotably attached to the lever means and a second end, and a flexible cable extending around said bend and having opposite ends secured to the second ends of the rod portions, respectively, to convert linear movement of the second rod portion into linear movement of the first rod portion.

8. A tool as described in claim 3, in which the pull member is a straight rod having a first end terminating in said radial end wall and a second end pivotably attached to the lever.

9. A tool as described in claim 3, in which the tubular guide portion has a bend therein of substantially 90°; and the pull member comprises a first straight rod portion having a first end terminating in said radial end wall and a second end, a second straight rod portion having a first end pivotably attached to the lever and a second end, and a flexible cable extending around said bend and having opposite ends secured to the second ends of the rod portions, respectively, to convert linear movement of the second rod portion into linear movement of the first rod portion.

* * * * *

UNITED STATES PATENT AND TRADEMARK OFFICE
CERTIFICATE OF CORRECTION

PATENT NO. : 4,653,309

DATED : March 31, 1987

INVENTOR(S) : Daniel A. Hendricks et al.

It is certified that error appears in the above-identified patent and that said Letters Patent are hereby corrected as shown below:

In the Abstract, 3rd line from the bottom, "oposite" should be -- opposite --.

Column 3, line 31, "threadably" should be -- threadedly --.

Column 3, line 41, "reliably" should be -- relatively --.

Column 4, line 53, "applications" should be -- applicants --.

Column 6, line 2, "ground" should be -- around --.

Column 6, line 46, "and" should be -- any --.

Signed and Sealed this

First Day of September, 1987

Attest:

DONALD J. QUIGG

Attesting Officer

Commissioner of Patents and Trademarks